US011200920B1

(12) United States Patent
Chang et al.

(10) Patent No.: US 11,200,920 B1
(45) Date of Patent: Dec. 14, 2021

(54) CARRIER SYSTEM FOR SUPPORTING MEMORY STORAGE DRIVES OF MULTIPLE SIZES

(71) Applicant: Quanta Computer Inc., Taoyuan (TW)

(72) Inventors: Chun Chang, Taoyuan (TW); Hsin-Chieh Lin, Taoyuan (TW); Yao-Long Lin, Taoyuan (TW); You-Jin Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/097,218

(22) Filed: Nov. 13, 2020

Related U.S. Application Data

(60) Provisional application No. 63/060,424, filed on Aug. 3, 2020.

(51) Int. Cl.
  *G11B 33/12* (2006.01)
  *G11B 33/02* (2006.01)
  *G06F 1/18* (2006.01)

(52) U.S. Cl.
  CPC .......... *G11B 33/022* (2013.01); *G11B 33/124* (2013.01); *G06F 1/187* (2013.01); *G11B 33/128* (2013.01)

(58) Field of Classification Search
  None
  See application file for complete search history.

(56) References Cited

U.S. PATENT DOCUMENTS

| 5,921,644 A | * | 7/1999 | Brunel | G11B 33/124 |
| | | | | 312/223.2 |
| 6,231,224 B1 | * | 5/2001 | Gamble | G06F 1/184 |
| | | | | 361/679.33 |
| 9,420,718 B2 | * | 8/2016 | Du | G11B 33/124 |
| 9,691,435 B2 | * | 6/2017 | Ehlen | G11B 33/128 |
| 10,317,957 B2 | * | 6/2019 | Adrian | G06F 1/187 |
| 10,455,715 B2 | * | 10/2019 | Choyikkunnil | G11B 33/124 |
| 10,622,026 B1 | * | 4/2020 | Tsorng | H05K 5/0282 |
| 2011/0069441 A1 | * | 3/2011 | Killen | G11B 33/128 |
| | | | | 361/679.33 |
| 2012/0236494 A1 | * | 9/2012 | Wallace | G06F 1/187 |
| | | | | 361/679.37 |
| 2013/0015309 A1 | * | 1/2013 | Fan | G06F 1/187 |
| | | | | 248/309.1 |
| 2017/0018293 A1 | * | 1/2017 | Chen | G11B 33/022 |

\* cited by examiner

*Primary Examiner* — William J Klimowicz
(74) *Attorney, Agent, or Firm* — Nixon Peabody LLP

(57) ABSTRACT

Described herein are example carrier systems for supporting memory storage drives of multiple sizes. The carrier systems include a carrier tray having a u-shape formed by a front bezel that extends between first and second lateral plates, and a tray adapter removably attached to the carrier tray. The carrier tray has a carrier internal space between the first and second lateral plates and is configured to receive a first memory storage drive. The tray adapter has a bottom plate that extends between first and second side walls. The tray adapter has a tray internal space between the first and second side walls, the tray internal space is configured to receive a second memory storage drive. The second memory storage drive has a smaller size than the first memory storage drive.

20 Claims, 5 Drawing Sheets

CARRIER SYSTEM FOR SUPPORTING MEMORY STORAGE DRIVES OF MULTIPLE SIZES

PRIORITY CLAIM

This application claims priority under 35 U.S.C. § 119 to U.S. Provisional Application No. 63/060,424, entitled "COMPATIBLE 2.5 INCH HDD & 3.0 SSD CARRIER," and filed on Aug. 3, 2020. The contents of that application are hereby incorporated by reference in their entirety.

TECHNICAL FIELD

The present disclosure relates generally to a carrier system for supporting memory storage drives of multiple sizes. More particularly, aspects of this disclosure relate to a carrier that can be adapted for holding 2.5" and 3.5" memory storage drives.

BACKGROUND

Servers are specialized computer systems that include numerous electrical components integrated into a single unit using a server chassis. Common to all servers is some form of a mother board including a CPU, bays for memory storage drives (e.g., 2.5" Hard Disk Drive (HDD), 2.5" Solid State Drive (SSD), 3.5" HDD, 3.5" SSD), slots for memory (e.g., DDR3, DDR4, DRAM), PCIe (Peripheral Computer Interconnect Express) slots, and connectors to other components, such as hard drives, a power supply, and peripherals (e.g., USB ports, LAN and other I/O ports).

Servers have evolved to having different form factors. These different form factors are accommodated by server racks having adjustable shelves. Although offering some flexibility, the standard systems do not provide modularization at the device level. For example, to accommodate memory storage drives of different sizes in server bays, different carrier must be used.

Thus, there is a need for a carrier that can accommodate different memory storage drives. For example, it would be desirable for the carrier to be adaptable to hold memory storage drives of multiple sizes, and compatible with a single server chassis.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings and each claim.

A first implementation of the disclosure is a carrier system for supporting memory storage drives of multiple sizes. The carrier system includes a carrier tray having a u-shape and a tray adapter removably attachable to the carrier tray. The carrier tray is formed by a front bezel that extends between first and second lateral plates, and includes a carrier internal space between the first and second lateral plates. The carrier internal space is configured to receive a first memory storage drive. The tray adapter has a bottom plate that extends between first and second side walls, and has a tray internal space between the first and second side walls. The tray internal space is configured to receive a second memory storage drive. The second memory storage drive has a smaller size than the first memory storage drive. Optionally, the first memory drive is a 2.5" HDD or 2.5" SSD, and the second memory drive is a 3.5" HDD or 3.5" SSD.

Optionally, the front bezel includes a lens configured to transmit light through the front bezel from an inner surface of the front bezel to a front surface of the front bezel. In some implementation, a first memory storage drive includes a light source. The light source is positioned on a front wall of the first memory storage drive, and the light source transmits light through the lens when the first memory storage drive is mounted in the carrier tray. In some other implementations, the light is transmitted from a second memory storage drive mounted in the carrier through a light pipe in the bottom plate. The light pipe traverses from a back edge of the bottom plate to a front edge of the bottom plate. The light pipe is aligned at the front edge of the bottom plate with the lens, and the light pipe is aligned at the back edge of the bottom plate with a light source connected to the second drive. Optionally, the light source is mounted to a server PCBA board connector connected to the second memory storage drive.

In some implementations, any one of (i) the front bezel, and (ii) the first and second lateral plates, include one or more coupling features for coupling the carrier tray to the first memory storage drive, or for coupling the carrier tray to the tray adapter. Optionally, the coupling feature comprises a hole, a screw, a bolt, a nut, rail, a groove, a pin, a latch, a snap fit, an interface fit, or a combination thereof. Optionally, the coupling feature includes a screw or bolt fastening the carrier tray to the tray adapter. The coupling feature includes a first hole through one of the first or second lateral plates of the carrier tray, and a second hole in one of the first or second side walls of the tray adapter. The screw or bolt is placed through the first hole and second hole, thereby coupling the carrier tray to the tray adapter. Optionally, the coupling feature includes a screw or bolt fastening the carrier tray to the first memory storage drive. The coupling feature includes the first hole through one of the first or second lateral plates of the carrier tray, and a third hole in a wall of the first memory storage drive. The screw or bolt is placed through the first and third hole, thereby coupling the carrier tray to the first memory storage drive. Optionally, the coupling feature includes a pin mounted to the inner surface of the front bezel, and a fourth hole in a front wall of the memory storage drive. The pin is inserted in the fourth hold and fastens the carrier tray to the first memory storage drive.

In some implementations, the bottom plate of the tray adapter includes a coupling feature for coupling the second memory storage drive to the adapter tray. Optionally, the coupling feature comprises a hole, a screw, a bolt, a nut, a rail, a groove, a pin, a latch, a snap fit, an interface fit, or a combination thereof. Optionally, the coupling feature includes a fifth hole through the bottom plate, and a sixth hole in a bottom wall of the second memory storage drive. A screw or bolt placed through the fifth hole and sixth hole fastens the tray adapter to the second memory storage drive.

Optionally, the front bezel includes a carrier handle connected to a latch, and a release button. The carrier handle is configured for positioning the carrier into a server hard drive bay and attaching the carrier system to the server hard drive bay. The release button is configured for releasing the carrier system from the server hard drive bay.

A second implementation of the disclosure is a server system. The server system includes a chassis having one or more hard drive bays. The server system also includes a carrier system configured for placement into one of the hard drive bays. The carrier system includes a carrier system according to the first implementation of the disclosure.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
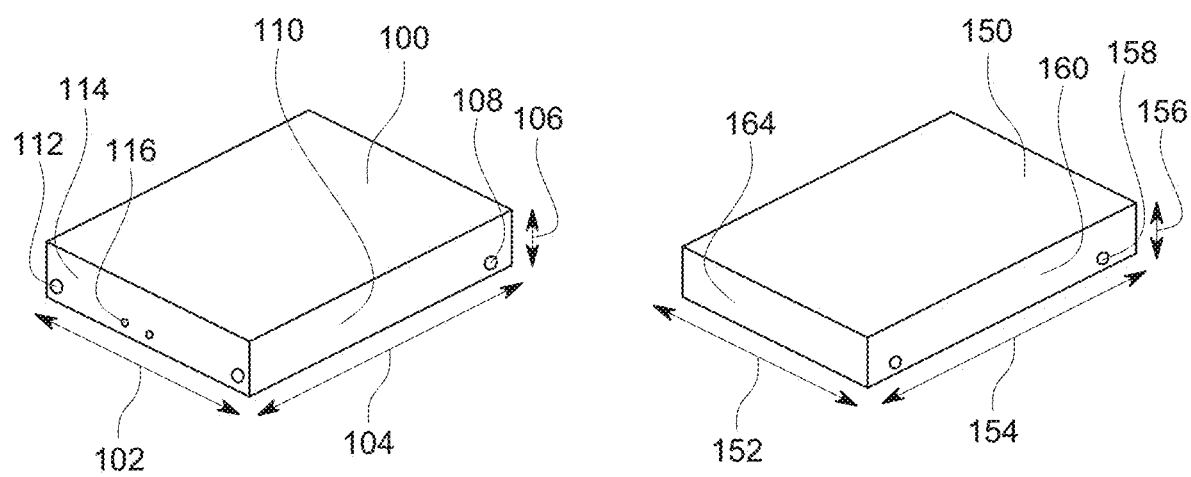
FIG. 1 is a prior art perspective view of a first memory storage drive, and a second memory storage drive.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements, and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed to carrier systems for supporting memory storage drives of multiple sizes, such as a first memory storage drive 100 and a second memory storage drive 150, as shown in FIG. 1. The first memory storage drive 100 has a width 102, a length 104, and a thickness 106. Hole 108 in a side wall 110, and holes 112 in a front wall 114 are also shown. The first memory storage drive 100 includes LED light 116. The second memory storage drive 150 has a width 152, a length 154, and a thickness 156. Holes 158 in a side wall 160 are also shown. A front wall 164 of the second memory storage drive 150 does not include holes or LED lights.

As used herein the "size" of the storage drive relates to physical dimensions and shape as well as other features. In some implementations, one or more features of the first memory storage drive 100 differ from one or more features of the second memory storage drive 150. For example, one or more of the width 102, the length 104, and the thickness 106 of the first memory storage drive 100 is different from the corresponding width 152, length 154 and thickness 156 of the second memory storage drive 150. In some implementations, at least one dimension of the width 152, the length 154, and the thickness 156 of the second memory storage drive 150 is smaller than at least one of the corresponding dimensions of width 102, length 104 and thickness 106 of the first memory storage drive 100. In some implementations the width 152 and the length 154 of the second memory storage drive 150 is smaller than the corresponding width 102 and length 104 of the first memory storage drive 100. In some implementations a spatial volume of the second memory storage drive 150 is less than a spatial volume of the first memory storage drive 100. For example, the second memory storage drive 150 can have a spatial volume about 99% or less, 95% or less, 90% or less, or 85% or less, than the spatial volume of the first memory storage drive 100.

In some implementations, holes 108, and 112 in the first memory storage drive 100, can differ in placement or quantity as compared to holes, such as 158, in the second memory storage drive 150. As noted above, the first memory storage drive 100 can also include LED light 116, whereas the second memory storage drive 150 does not have similarly placed LED lights.

The table below is a form factor comparison between the first memory storage drive 100 and the second memory storage drive 150 according to some implementations. In this implementation, the first memory storage drive 100 is configured as a E3.S SSD, and the second memory storage drive 150 is configured as a 2.5" HDD. Other form factors can be accommodated according to some other implementations. In some implementations the first memory storage drive 100 is any 3.5" drive, such as a 3.5" HDD. In some implementations, the second memory storage drive 150 is any 2.5" drive, such as a 2.5" SSD.

TABLE

Form Factor Comparison

|  | Memory Storage Drive 100 | Memory Storage Drive 150 |
|---|---|---|
| Storage Drive Width | E3.S SSD 76 mm | 2.5" HDD 69.85 mm |

TABLE-continued

Form Factor Comparison

| | Memory Storage Drive 100 | Memory Storage Drive 150 |
|---|---|---|
| Length | 100.45 mm | 104.9 mm |
| Thickness | 16.8 mm | 15 mm |
| Volume | 128.25 cm³ | 109.91 cm³ |
| Screw holes | L&R side ×1 | L&R Side ×2 |
| | Front ×2 | Bottom ×4 |
| LED | Yes | No |
| Connection | SFF-TA-1002 | SFF-8639 |

Figure 2:
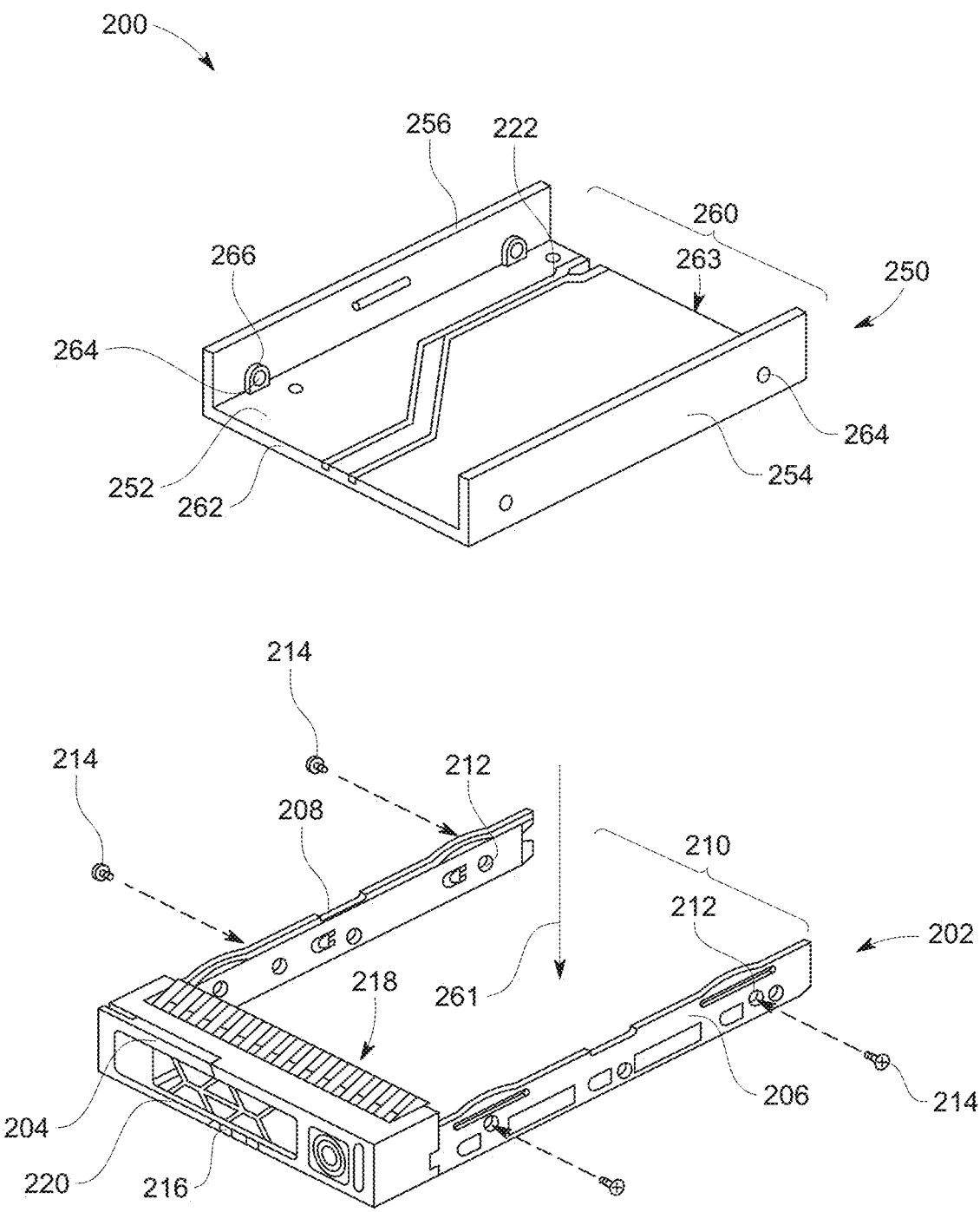
FIG. 2 is a perspective view of a carrier system for supporting memory storage drives of multiple sizes according to some implementations.

FIG. 2 is a perspective view of a carrier system 200 for supporting memory storage drives of multiple sizes according to some implementations. The carrier system 200 includes a carrier tray 202 and a tray adapter 250. The carrier tray 202 has a u-shape formed by a front bezel 204 that extends from a first lateral plate 206 and a second lateral plate 208. The carrier tray 202 also includes a carrier internal space 210 between the lateral plates 206, 208. The tray adapter 250 includes a bottom plate 252 that extends between a first side wall 254, and a second side wall 256. The tray adapter 250 also includes a tray internal space 260 between the side walls 254, 256.

As indicated by a solid arrow 261, the carrier internal space 210 is configured to receive the tray adapter 250. The carrier tray 202 includes a hole 212 in the first lateral plate 206, and optionally in the second lateral plate 208. The tray adapter 250 includes a hole 264 in the first side wall 254, and optionally in the second side wall 256. The hole 212 and the hole 264 are aligned when the tray adapter 250 is positioned in the carrier internal space 210. A screw or bolt 214 is placed through the hole 212 and the hole 264 to removably attach the carrier tray 202 to the tray adapter 250.

In some implementations the side walls 254, 256 can include a feature, such as a screw post 266, which provides an extension of hole 264 for fastening the screw or bolt 214. As used herein, for a screw, the hole 212 and the hole 264 are threaded. For a bolt, the hole 212 is not threaded and at least a portion of hole 264 can be threaded. For example, in some implementations only the screw post 266 is threaded. Alternatively, both the hole 212 and the hole 264 are not threaded and the bolt 214 is used with a nut. For example, in some implementations the screw post 266 is replaced with a nut.

Although holes (e.g., 212, 264) and the screw or bolt 214 is shown, other fasteners can be used according to some implementations. For example, coupling features including a hole, a screw, a bolt, a nut, rail, a groove, a pin, a latch, a snap fit, and an interface fit, or a combination of these can be used. In some implementations, a rail is part of a first plate, wall or surface, such as the first lateral plate 206 or the first side wall 254. The rail can be mated with a corresponding groove in a second plate, wall or surface, such as the first side wall 254 or the first lateral plate 206. In some implementations of a coupling feature, a pin can be fixed or mounted on a first plate, wall or surface, and the pin can be inserted through a corresponding hole in a second plate, wall or surface. In some implementations, a latch on a first plate, wall or surface can be mated with a corresponding strike plate, hole, loop or indentation, in a second plate, wall or surface. In some implementations of an interference fit, a nub on a first plate, wall or surface, is mated with a corresponding indentation in a second plate, wall or surface. In some implementations, the coupling is a snap fit, such as wherein the facing lateral plates 206 and 208 contact the corresponding side walls 254 and 256. The snap fit provides a tight fit for the tray adapter 250 when it is position in the carrier internal space 210 of the carrier tray 202. The snap fit can also include other coupling features such as a protrusion on a first plate, wall or surface mating with an indentation in a corresponding plate, wall or surface.

In some implementations, the front bezel 204 of the carry tray 202 includes a lens 216. The lens is configured to transmit light through the front bezel 204 from an inner surface 218 of the front bezel 204, to a front surface 220 of the front bezel 204. As used herein a lens can be made of any visible light transmitting material such as glass, quartz, a transparent polymer or even air (e.g., a hole through the front bezel 204).

The carrier tray 202 also includes a light pipe 222 in the bottom plate 252. The light pipe 222 traverses from a back edge 263 of bottom plate 252, to a front edge 262 of the bottom plate 252. As used herein a light pipe is a thin filament that transmit light signals through internal reflections from a source, located at one end of the filament, to a destination, located at an opposite end of the filament. The light pipe 222 can be made from, for example, glass or plastic. In the implementation shown by FIG. 2, light can enter from the back edge 263, through the light pipe 222, and out of the front edge 262. In some implementations, the light pipe includes several filaments or groups of filaments, each for transmitting light from a different light source. In some implementations, the light pipe 222 and the lens 216 work cooperatively to transmit light from the back of the carrier system 200 to the front of the carrier system, as will be described in detail with reference to following FIG. 3.

Figure 3:
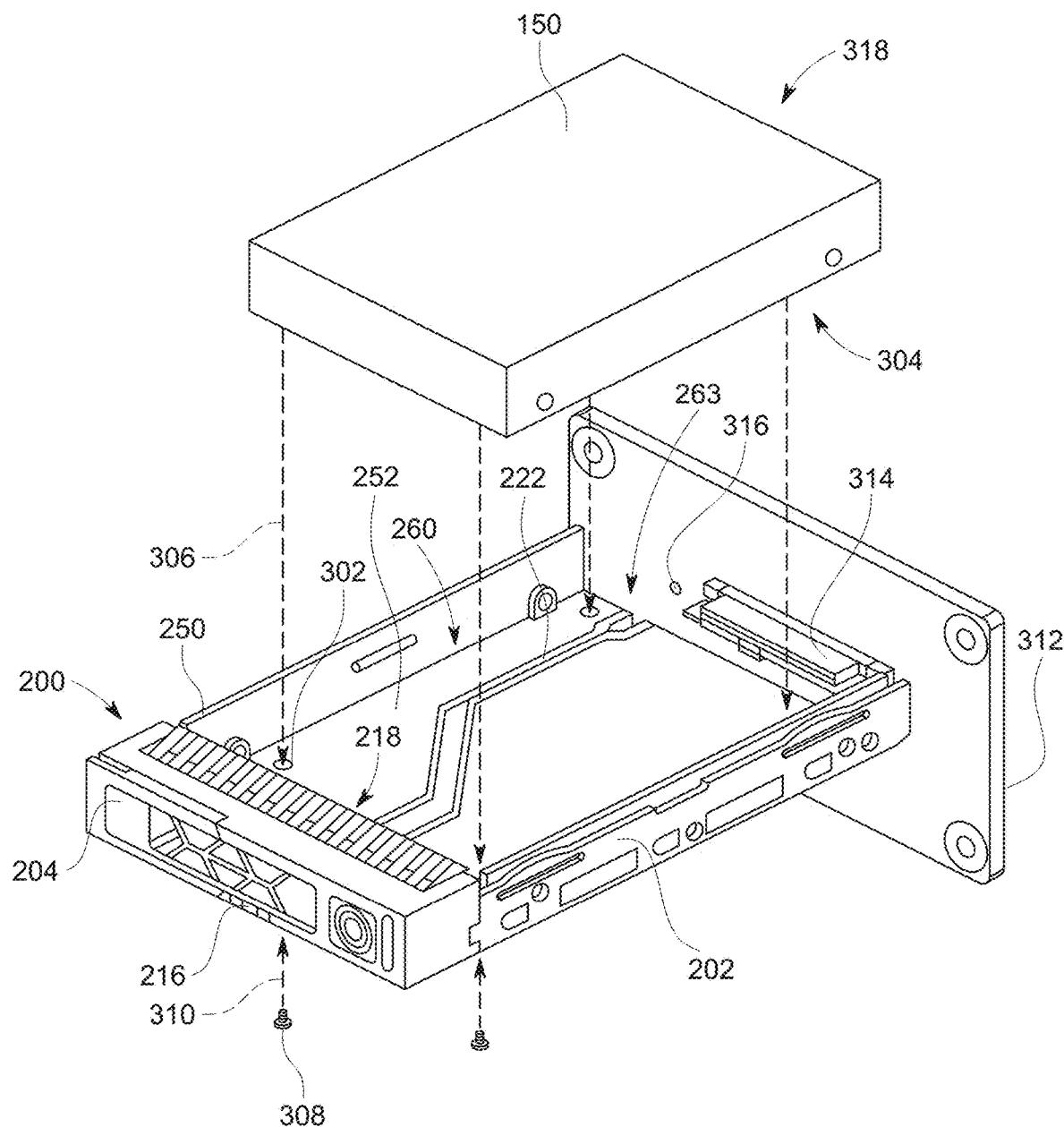
FIG. 3 is a perspective view of the carrier system including the carrier tray coupled to the tray adapter according to some implementations.

FIG. 3 is a perspective view of the carrier system 200 including the carrier tray 202 coupled to the tray adapter 250. The tray internal space 260 is configured to receive a memory storage drive, such as second memory storage drive 150. Holes 302 in the bottom plate 252 and holes (not shown) on a bottom wall 304, of the second memory storage drive 150, can be aligned as indicated by downward-pointing dashed arrows 306. Screws or bolts 308 can be inserted through the holes 302 and through the holes in the bottom wall 304, as indicated upward-pointing dashed arrows 310. The screws or bolts 308 thereby couple the second memory storage drive 150 to the carrier system 200. According to other implementations, other fasteners as previously described can be used to couple the second memory storage drive 150 to the carrier system 200.

A PCBA board 312 including a connector 314 and an LED light 316 is also shown. In some implementations, the PCBA board 312 is a component in a server. The second memory storage drive 150 can be connected to the connector 314 by a mating connector (not shown) that is positioned on a back wall 318 of the second memory storage drive 150. This provides an electrical connection between the second memory storage drive 150 to the LED light 316. The electrical connection provided by the connector 314 also provides other connections, for example, to other components in a server such as the mother board and a power supply.

When the second memory storage drive 150 is coupled to carrier system 200, a light source, such as the LED light 316, is aligned with the light pipe 222 and with the lens 216. Due to this alignment, light signals from the LED light 316 can travel into the light pipe 222 through back the edge 263, and the light can travel out of the light pipe 222 through the front edge 262 (FIG. 2). The light signal then enters the inner surface 218 of the front bezel 204 and out through the front surface 220 through the lens 216. The LED light 316 can signal the activity of the second memory storage drive 150, such as indications of it being energized or its memory contents being accessed. In some implementations, multiple light sources, such as the LED light 316, can be used and can each have different signaling functions.

Figure 4:
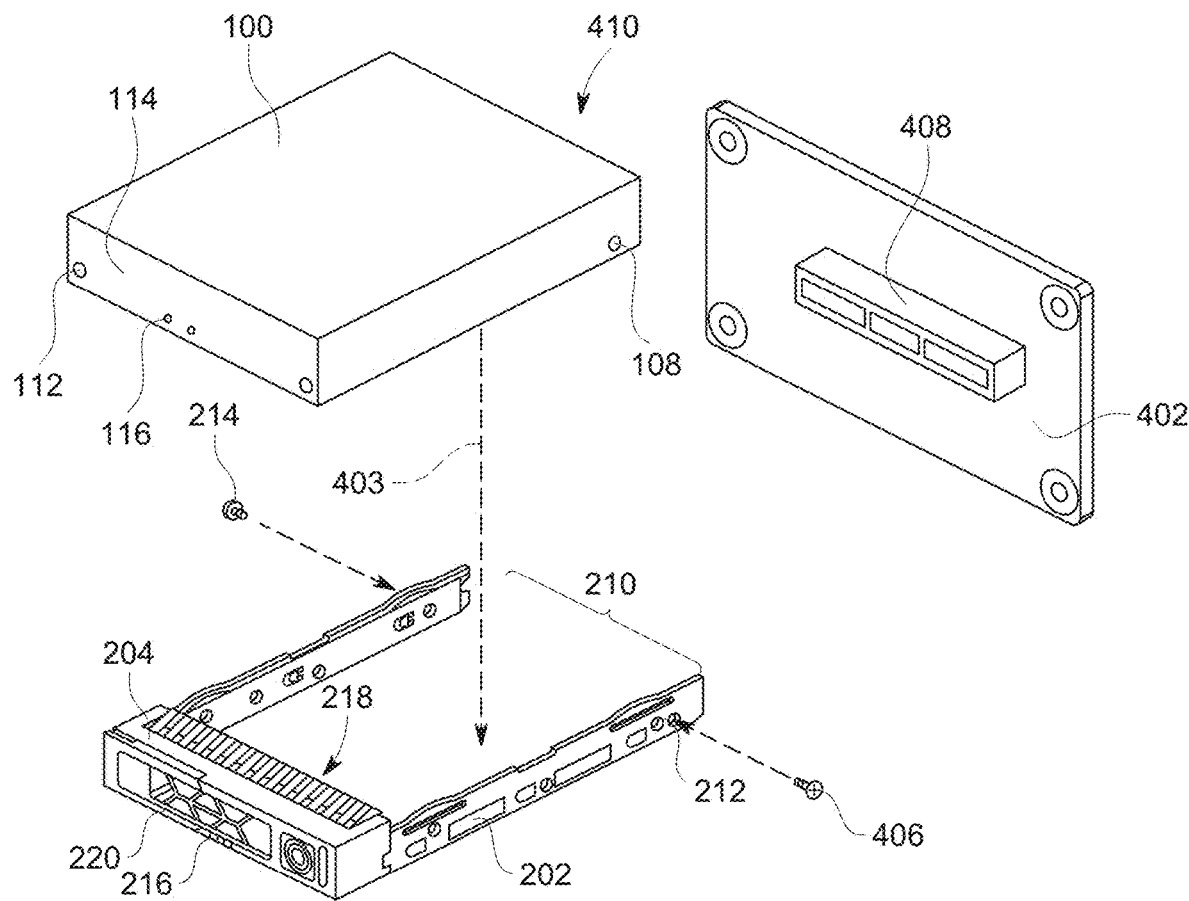
FIG. 4 is a perspective view of the carrier tray, a first memory storage drive, and a PCBA board according to some implementations.

FIG. 4 is a perspective view of the carrier tray 202, the first memory storage drive 100, and a PCBA board 402. As indicated by dashed arrow 403, the carrier internal space 210 is configured to receive the first memory storage drive 100. When the first memory storage drive 100 is position in the carrier internal space 210, the hole 212 aligns with hole 108. A screw or bolt 406 placed through the hole 212 and the hole 108 fastens the first memory storage drive 100 to the carrier tray 202. The holes 112 in front wall 114 can also be used for fastening. In this implementation, a pin (not shown) is mounted to inside surface 218 of the front bezel 204. The mounted pin is configured to be inserted into hole 112 when the first memory storage drive 100 is coupled to the carrier tray 202. Other fasteners as previously described can also be used to fasten the first memory storage drive 100 to the carrier tray 202.

The PCBA board 402 includes a connector 408 for connecting to a mating connector (not seen) that is positioned on a back wall 410 of the first memory storage drive 100. The PCBA board provides an electrical connection from the first memory storage drive 100 to other components, such as components in a server system.

The LED light 116 on front wall 114 is configured to align with the lens 216 of the front bezel 204, when the first memory storage drive 100 is coupled to the carrier tray 202. The lens 216 transmits light from the LED light 116 through the inner surface 218 and out of the front surface 220.

Figure 5A:
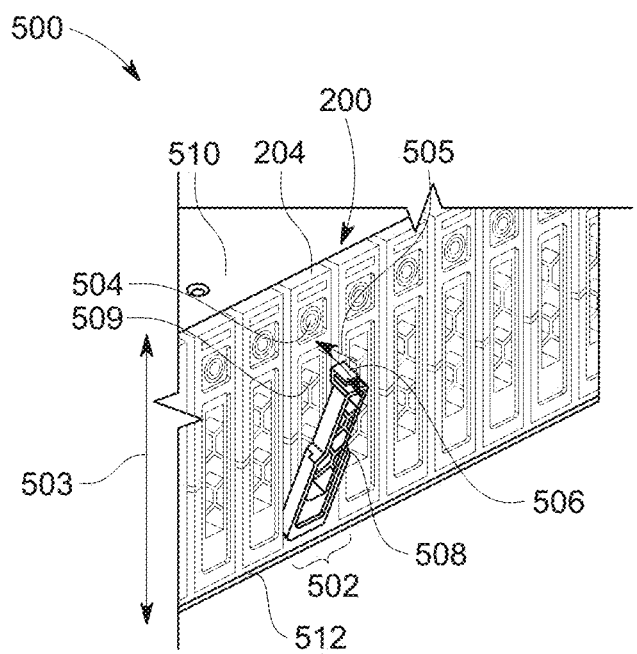
FIG. 5A shows a first instance of removal of a carrier module from a server chassis according to some implementations.
Figure 5B:
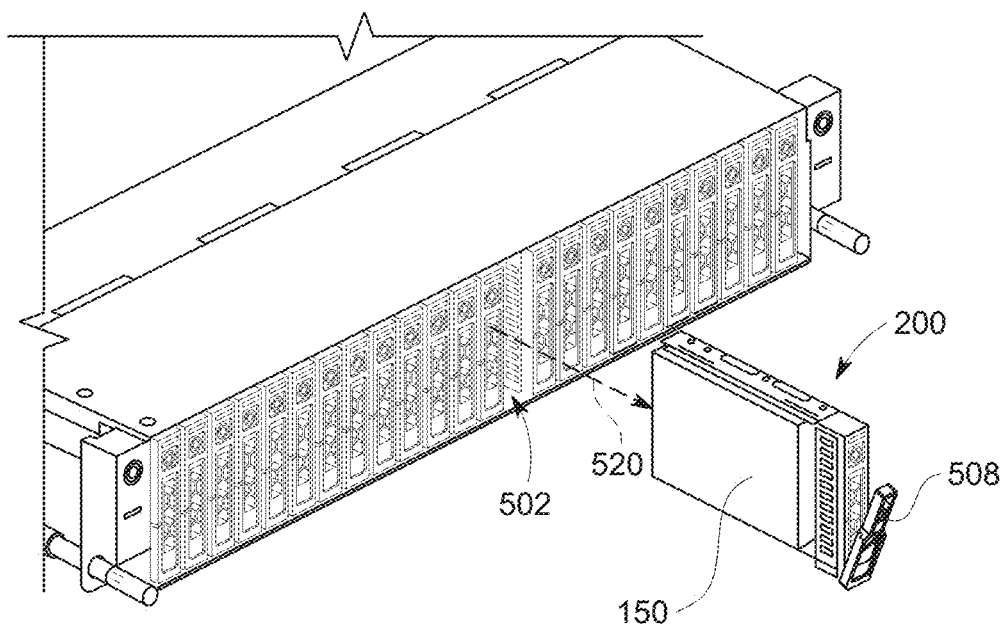
FIG. 5B shows another instance of the removal of the carrier module from the server chassis.

The front bezel 204 also includes a latching mechanism for attaching the carrier system 200 to a bay of a server chassis. FIG. 5A shows the operation of the latching mechanism. A front portion of a server chassis 500 is shown with carrier system 200 in hard drive bay positions 502. In some implementations the carrier system 200 is held in the hard drive bay position 502 due to a tight fit of the front bezel 204 in the hard drive bay position 502. The tight fit provides a vertical force, indicated by the two headed arrow 503, against the top 510 and bottom 512 of the server chassis 500. When a latch button 504 is depressed as indicated by the arrow 505, the latch 506 and a carrier handle 508 are released. The carrier handle 508 swings away from the latch button 504 as indicated by curved dashed arrow 509, and the vertical force 503 is removed. The carrier handle 508 can be grasped, and, as shown in FIG. 5B, the carrier system 200 can be pulled out of the hard drive bay 502, as indicated by the dashed arrow 520. As shown, the carrier system 200 is holding the second memory storage drive 150. By reversing the steps, carrier system 200 holding the first memory storage drive 100 (FIG. 1), or a different second memory storage drives 150, can be inserted into the hard drive bay 502. The carrier system 200 thereby can allow different memory storage drives to be used with the server chassis 500.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A carrier system for supporting memory storage drives of multiple sizes, the carrier system comprising:
    a carrier tray having a u-shape formed by a front bezel that extends between first and second lateral plates, the carrier tray having a carrier internal space between the first and second lateral plates, the carrier internal space being configured to receive a first memory storage drive; and
    a tray adapter removably attachable to the carrier tray, the tray adapter having a bottom plate that extends between first and second side walls, the tray adapter having a tray internal space between the first and second side walls, the tray internal space being configured to receive a second memory storage drive, the second memory storage drive having a smaller size than the first memory storage drive;
    wherein the front bezel includes a lens configured to transmit light through the front bezel from a back surface of the front bezel to a front surface of the front bezel; and
    wherein the first memory storage drive includes a light source, the light source being positioned on a front wall of the first memory storage drive, the light source transmitting light through the lens when the first memory storage drive is mounted in the carrier tray.

2. The carrier system according to claim 1, wherein the light is transmitted from a second memory storage drive mounted in the carrier system through a light pipe in the bottom plate.

3. The carrier system according to claim 2, wherein the light pipe traverses from a back edge of the bottom plate to a front edge of the bottom plate, the light pipe is aligned at the front edge of the bottom plate with the lens, and the light pipe is aligned at the back edge of the bottom plate with a light source connected to the second memory storage drive.

4. The carrier system according to claim 3, wherein a second light source is mounted to a server PCBA board connector connected to the second memory storage drive.

5. The carrier system according to claim 1, wherein any one of (i) the front bezel, and (ii) the first and second lateral plates, include one or more coupling features for coupling the carrier tray to the first memory storage drive, or for coupling the carrier tray to the tray adapter.

6. The carrier system according to claim 5, wherein the coupling feature comprises a hole, a screw, a bolt, a nut, a rail, a groove, a pin, a latch, a snap fit, an interface fit, or a combination thereof.

7. The carrier system according to claim 6, wherein the coupling feature includes:
a first hole through one of the first or second lateral plates of the carrier tray;
a second hole in one of the first or second side walls of the tray adapter;
the screw or bolt placed through the first and second hole, the screw or bolt fastening the carrier tray to the tray adapter.

8. The carrier system according to claim 6, wherein the coupling feature includes:
a first hole through one of the first or second lateral plates of the carrier tray;
a third hole in a wall of the first memory storage drive;
the screw or bolt placed through the first and third hole, the screw or bolt fastening the carrier tray to the first memory storage drive.

9. The carrier system according to claim 6, wherein the coupling feature includes:
the pin mounted to an inner surface of the front bezel;
a fourth hole in a front wall of the first memory storage drive; and
the pin inserted in the fourth hole and fastening the carrier tray to the first memory storage drive.

10. The carrier system according to claim 1, wherein the bottom plate of the tray adapter includes a coupling feature for coupling the second memory storage drive to the tray adapter.

11. The carrier system according to claim 10, wherein the coupling feature comprises a hole, a screw, a bolt, a nut, a rail, a groove, a pin, a latch, a snap fit, an interface fit, or a combination thereof.

12. The carrier system according to claim 11, wherein the coupling feature includes:
a fifth hole through the bottom plate;
a sixth hole in a bottom wall of the second memory storage drive; and
a screw or bolt placed through the fifth hole and sixth hole, the screw or bolt fastening the tray adapter to the second memory storage drive.

13. The carrier system according to claim 1, wherein the front bezel includes a carrier handle connected to a latch, and a release button, wherein the carrier handle is configured for positioning the carrier system in a server hard drive bay and attaching the carrier system to the server hard drive bay, and the release button is configured for releasing the carrier system from the server bay.

14. The carrier system according to claim 1, wherein the second memory storage drive is a 2.5" Hard Disk Drive (HDD) or 2.5" Solid State Drive (SSD), and the first memory storage drive is a 3.5" HDD or 3.5" SSD.

15. A server system comprising:
a chassis having one or more hard drive bays;
a carrier system configured for placement into one of the hard drive bays, carrier system comprising;
a carrier tray having a u-shape formed by a front bezel that extends between first and second lateral plates, the carrier tray having a carrier internal space between the first and second lateral plates, the carrier internal space being configured to receive a first memory storage drive; and
a tray adapter removably attachable to the carrier tray, the tray adapter having a bottom plate that extends between first and second side walls, the tray adapter having a tray internal space between the first and second side walls, the tray internal space being configured to receive a second memory storage drive, the second memory storage drive having a smaller size than the first memory storage drive;
wherein the front bezel includes a lens configured to transmit light through the front bezel from a back surface of the front bezel to a front surface of the front bezel; and
wherein the first memory storage drive includes a light source, the light source being positioned on a front wall of the first memory storage drive, the light source transmitting light through the lens when the first memory storage drive is mounted in the carrier tray.

16. A carrier system for supporting memory storage drives of multiple sizes, the carrier system comprising:
a carrier tray having a u-shape formed by a front bezel that extends between first and second lateral plates, the carrier tray having a carrier internal space between the first and second lateral plates, the carrier internal space being configured to receive a first memory storage drive; and
a tray adapter removably attachable to the carrier tray, the tray adapter having a bottom plate that extends between first and second side walls, the tray adapter having a tray internal space between the first and second side walls, the tray internal space being configured to receive a second memory storage drive, the second memory storage drive having a smaller size than the first memory storage drive;
wherein the front bezel includes a lens configured to transmit light through the front bezel from a back surface of the front bezel to a front surface of the front bezel; and
wherein the light is transmitted from the second memory storage drive mounted in the carrier system through a light pipe in the bottom plate.

17. The carrier system according to claim 16, wherein the first memory storage drive includes a light source, the light source being positioned on a front wall of the first memory storage drive, the light source transmitting light through the lens when the first memory storage drive is mounted in the carrier tray.

18. The carrier system according to claim 16, wherein any one of (i) the front bezel, and (ii) the first and second lateral plates, include one or more coupling features for coupling the carrier tray to the first memory storage drive, or for coupling the carrier tray to the tray adapter.

19. The carrier system according to claim 16, wherein the bottom plate of the tray adapter includes a coupling feature for coupling the second memory storage drive to the tray adapter.

20. The carrier system according to claim 16, wherein the front bezel includes a carrier handle connected to a latch, and a release button, wherein the carrier handle is configured for positioning the carrier system in a server hard drive bay and attaching the carrier system to the server hard drive bay, and the release button is configured for releasing the carrier system from the server bay.

* * * * *